US008725515B2

(12) United States Patent
Chen et al.

(10) Patent No.: US 8,725,515 B2
(45) Date of Patent: May 13, 2014

(54) ELECTRONIC APPARATUS AND METHOD FOR CONTROLLING THE ELECTRONIC APPARATUS USING VOICE

(75) Inventors: Chun-Sheng Chen, New Taipei (TW); Hua Zou, Shenzhen (CN); Feng-Long He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/241,074

(22) Filed: Sep. 22, 2011

(65) Prior Publication Data

US 2012/0303373 A1 Nov. 29, 2012

(30) Foreign Application Priority Data

May 24, 2011 (CN) .......................... 2011 1 0135206

(51) Int. Cl.
*G10L 15/22* (2006.01)
(52) U.S. Cl.
USPC .......................... 704/275; 704/251; 704/270
(58) Field of Classification Search
USPC .......................... 704/275, 251, 270
See application file for complete search history.

(56) References Cited

U.S. PATENT DOCUMENTS

| | | | | |
|---|---|---|---|---|
| 4,547,849 A * | 10/1985 | Louie et al. ........................ 710/3 |
| 4,991,217 A * | 2/1991 | Garrett et al. ................. 704/235 |
| 5,577,214 A * | 11/1996 | Bhattacharya ................ 710/107 |
| 5,577,250 A * | 11/1996 | Anderson et al. ............. 718/100 |
| 5,710,911 A * | 1/1998 | Walsh et al. ................... 713/500 |
| 5,778,237 A * | 7/1998 | Yamamoto et al. ........... 713/322 |
| 5,956,682 A * | 9/1999 | Loudermilk et al. ......... 704/272 |
| 6,163,768 A * | 12/2000 | Sherwood et al. ............ 704/235 |
| 6,253,184 B1 * | 6/2001 | Ruppert ........................ 704/275 |
| 6,665,639 B2 * | 12/2003 | Mozer et al. .................. 704/244 |
| 6,816,837 B1 * | 11/2004 | Davis ............................ 704/275 |
| 2002/0116196 A1 * | 8/2002 | Tran ............................. 704/270 |
| 2002/0138265 A1 * | 9/2002 | Stevens et al. ................ 704/251 |
| 2002/0161586 A1 * | 10/2002 | Wang ............................ 704/275 |
| 2003/0055535 A1 * | 3/2003 | Voeller et al. ................. 700/279 |
| 2005/0165609 A1 * | 7/2005 | Zuberec et al. ............... 704/270 |
| 2005/0261907 A1 * | 11/2005 | Smolenski et al. ........... 704/270 |
| 2006/0074686 A1 * | 4/2006 | Vignoli ......................... 704/275 |
| 2007/0192109 A1 * | 8/2007 | Likens et al. ................. 704/275 |
| 2008/0144854 A1 * | 6/2008 | Abreu ............................. 381/74 |
| 2008/0228481 A1 * | 9/2008 | Mozer ........................... 704/247 |
| 2008/0275699 A1 * | 11/2008 | Mozer ........................... 704/231 |
| 2009/0043580 A1 * | 2/2009 | Mozer et al. .................. 704/251 |

FOREIGN PATENT DOCUMENTS

KR 1020020033338 A * 5/2002 .............. G06F 3/033

OTHER PUBLICATIONS

Sinha, Book "Speech Processing in Embedded Systems, 2010"—Springer, Jan 1, 2010.*
Lin, "The TMS320 Family of Digital Signal Processors" Proceedings of the IEEE, Vol. 75, No. 9, Sep. 1987.*

(Continued)

*Primary Examiner* — Jialong He
(74) *Attorney, Agent, or Firm* — Novak Druce Connolly Bove + Quigg LLP

(57) ABSTRACT

An electronic apparatus includes a microphone, a processor, a motherboard, and a voice recognition microchip. The voice recognition microchip compares a voice command with a pre-stored voice command. If the voice command is identical with the pre-stored voice command, the processor outputs a control signal to the motherboard. The motherboard controls the electronic apparatus to perform an action corresponding to the control signal.

11 Claims, 4 Drawing Sheets

(56) References Cited

OTHER PUBLICATIONS

Guimarães et al, "A Signal Processing System Based upon Monolithic Neural Coprocessors" IEEE Proceedings of Neural Networks, 1998.*
Homeseer2010 (available at http://web.archive.org/web/20101216154906/http://homeseer.com/support/homeseer/WebHelp2/screens_voice_commands.htm).*
Wiki2010 (available at http://web.archive.org/web/20100215042319/http://en.wikipedia.org/wiki/Intel_8086.*
SC-691 Speech and muisc processor, [online] www.sensory.com, published 2010.*
RSC-4128 Speech recogntion microcontroller, [online], www.sensory.com, published 2006.*
RSC-4x Evaluation manual, [online], www.sensory.com, published 2006.*

* cited by examiner

ELECTRONIC APPARATUS AND METHOD FOR CONTROLLING THE ELECTRONIC APPARATUS USING VOICE

BACKGROUND

1. Technical Field

The disclosure generally relates to electronic apparatus, particularly to a electronic apparatus using voice recognition technology and a method for controlling the electronic apparatus using voice.

2. Description of the Related Art

Some computers implement voice recognition technology, where the computer may receive voice commands from a microphone, and the voice commands are converted into electrical signals to control the computer. However, when the computer is off, the inability of the computer to recognize voice commands is a disadvantage because the computer cannot be turned on using the voice recognition technology.

Therefore, there is room for improvement within the art.

BRIEF DESCRIPTION OF THE DRAWINGS

Many aspects of an exemplary electronic apparatus and method for controlling the electronic apparatus using voice can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
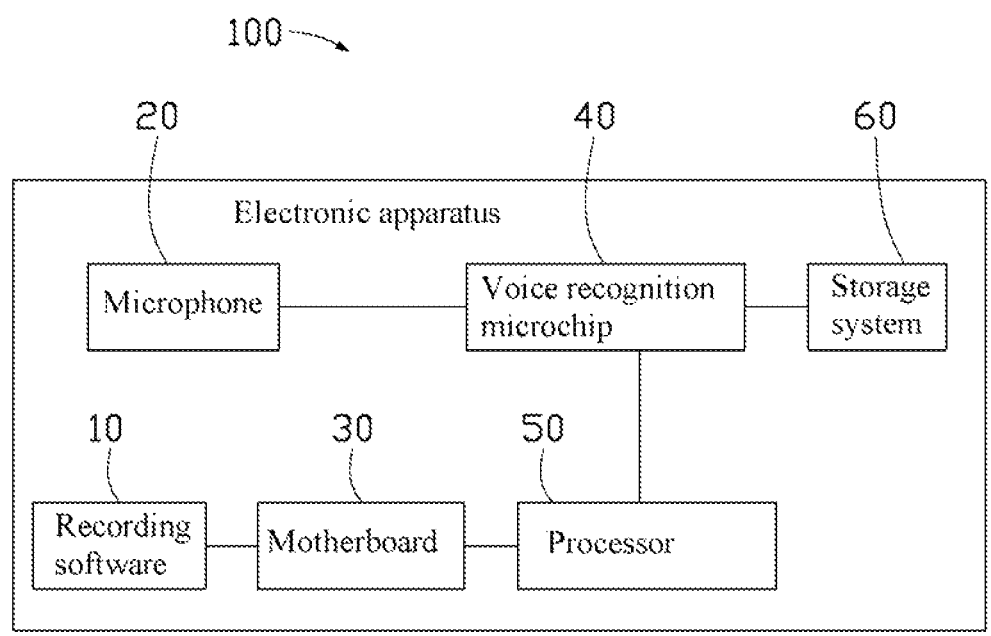
FIG. 1 is a block diagram of an electronic apparatus, according to an exemplary embodiment.

FIG. 1 shows an electronic apparatus 100 using voice recognition technology, according to an exemplary embodiment. The electronic apparatus 100 can be a personal computer, a server, or any other electronic device. The electronic apparatus 100 includes recording software 10, a microphone 20, a motherboard 30, a voice recognition microchip 40, a processor 50, and a storage system 60 (e.g., a hard drive).

The recording software 10 can be an application program installed in the storage system 60. The recording software 10 can supply a human-computer interaction (HCI) interface for users. When there is a need for recording, the recording software 10 sends a request command to the motherboard 30, in order to control the voice recognition microchip 40 to enter a recording mode.

The microphone 20 is electronically connected to the voice recognition microchip 40. The microphone 20 is capable of picking up voice commands from users and sending the voice commands to the voice recognition microchip 40.

The motherboard 30 is electronically connected to the recording software 10 and the processor 50, and the processor 50 is electronically connected to the voice recognition microchip 40. Thus, the motherboard 30 can transmit the request command to the voice recognition microchip 40 through the processor 50. Additionally, the motherboard 30 is directed by the processor 50 to control the electronic apparatus 100 to turn on/off and perform other operations (e.g., menu selections).

Figure 2:
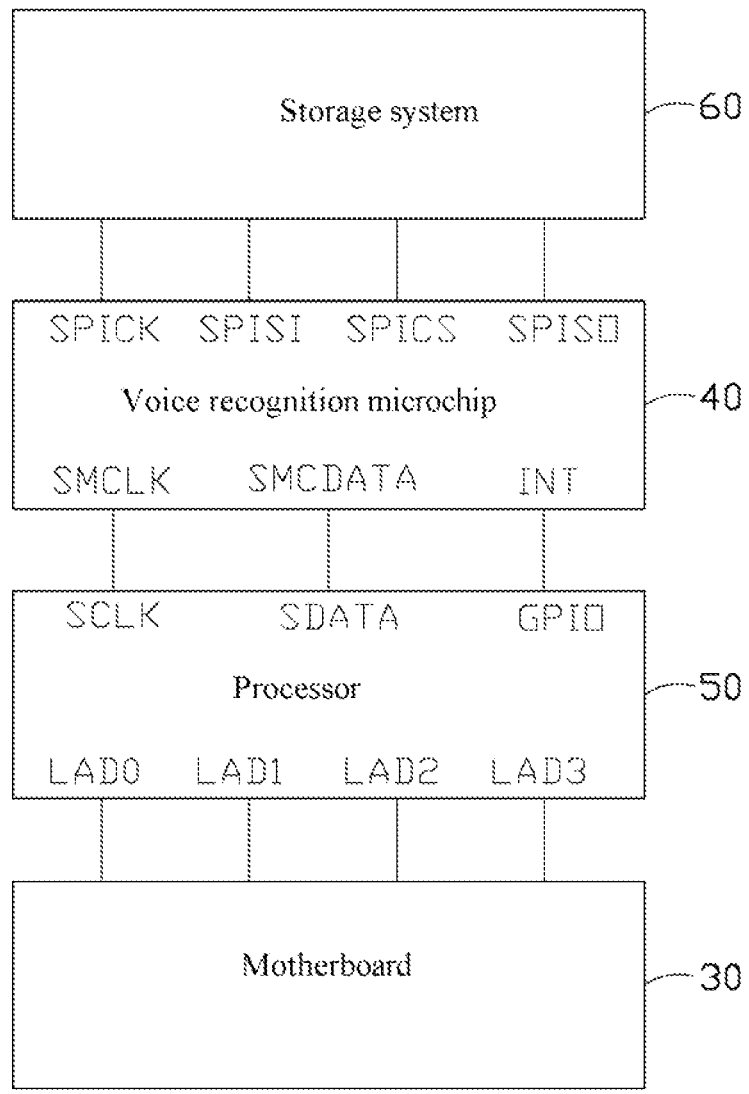
FIG. 2 is a circuit view of one embodiment of the electronic apparatus as shown in FIG. 1.

Referring to FIG. 2, the voice recognition microchip 40 includes a clock pin SMCLK, a data pin SMCDATA, an interrupt pin INT, and serial peripheral interface (SPI) pins SPICSK, SPISI, SPICS, SPISO. The clock pin SMCLK, the data pin SMCDATA and the interrupt pin INT are all electronically connected to the processor 50, and the interrupt pin INT may output interrupt signals to the processor 50. The SPI pins SPICSK, SPISI, SPICS, and SPISO are all electronically connected to the storage system 60, thus the voice commands from the microphone 20 can be stored in the storage system 60 through the SPI pins SPICSK, SPISI, SPICS, and SPISO.

During a recording process, the voice recognition microchip 40 enters the recording mode when the request command is received, and then outputs a first interrupt signal to the processor 50. The microphone 20 receives voice commands from the microphone 20 and compares at least two voice commands. If the two voice commands are identical, the voice commands are stored in the storage system 60. If the two voice commands are not identical, the interrupt pin INT will output a second interrupt signal to the processor 50 to indicate recording failure. During a voice recognition process, the voice recognition microchip 40 can determine whether a new voice command from the microphone 20 is identical with the voice commands pre-stored in the storage system 60, and output a third interrupt signal to the processor 50 according to a determination of the new voice command and the voice commands pre-stored in the storage system 60.

The processor 50 is operable to respond to the interrupt signals from the voice recognition microchip 40, in order to control the motherboard 30 and the recording software 10. The processor 50 includes a clock terminal SCLK, a data terminal SDATA, a general purpose input/output terminal GPIO and control terminals LAD0, LAD1, LAD2, LAD3. The clock terminal SCLK is electronically connected to the clock pin SMCLK, the data terminal SDATA is electronically connected to the data pin SMCDATA. Thus, the processor 50 can transmit the request command to the voice recognition microchip 40. The general purpose input/output terminal GPIO is electronically connected to the interrupt pin INT to receive the interrupt signals. The control terminals LAD0, LAD1, LAD2, and LAD3 are all electronically connected to the motherboard 30. During the recording process, the processor 50 can directly control the recording software 10 to execute a recording operation when receiving the first interrupt signal. During the voice recognition process, the processor 50 can correspondingly output a control signal to the motherboard 30 when receiving the third interrupt signal.

Figure 3:
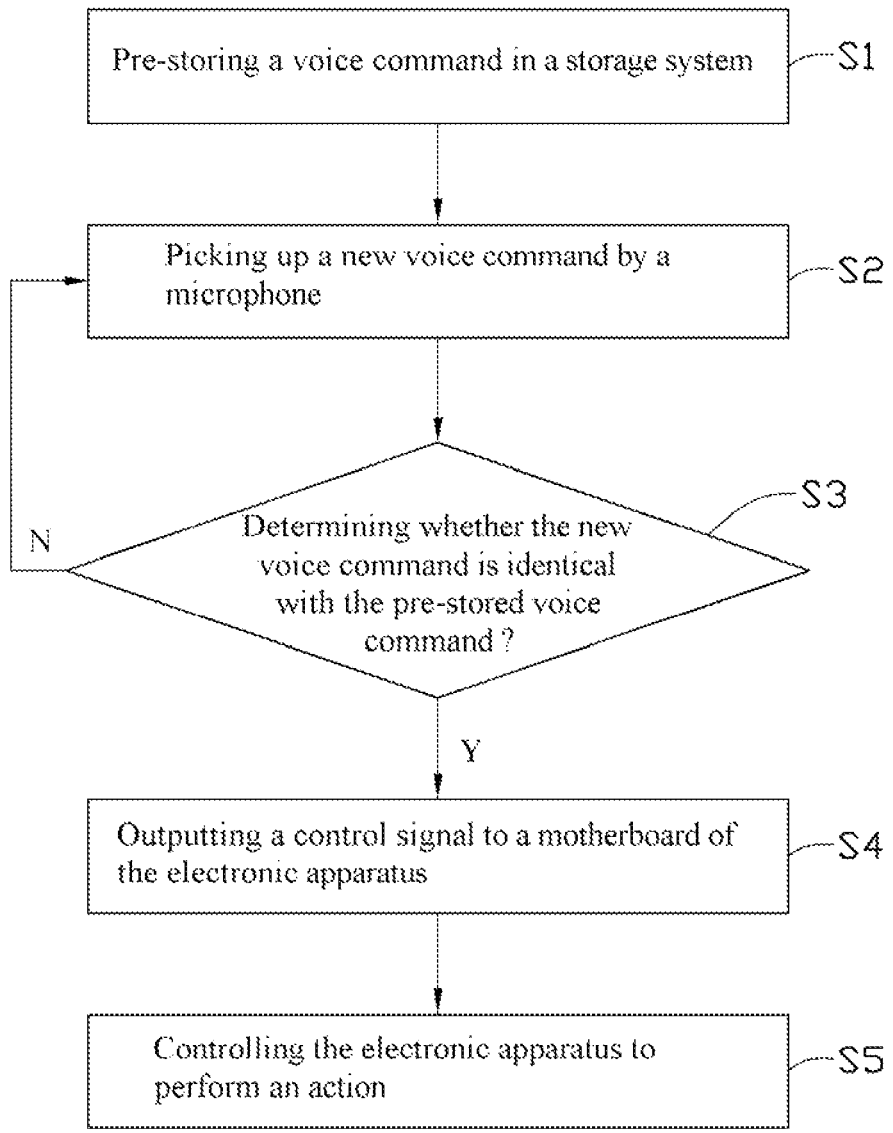
FIG. 3 is a flowchart illustrating a method for controlling the electronic apparatus using voice, according to an exemplary embodiment.
Figure 4:
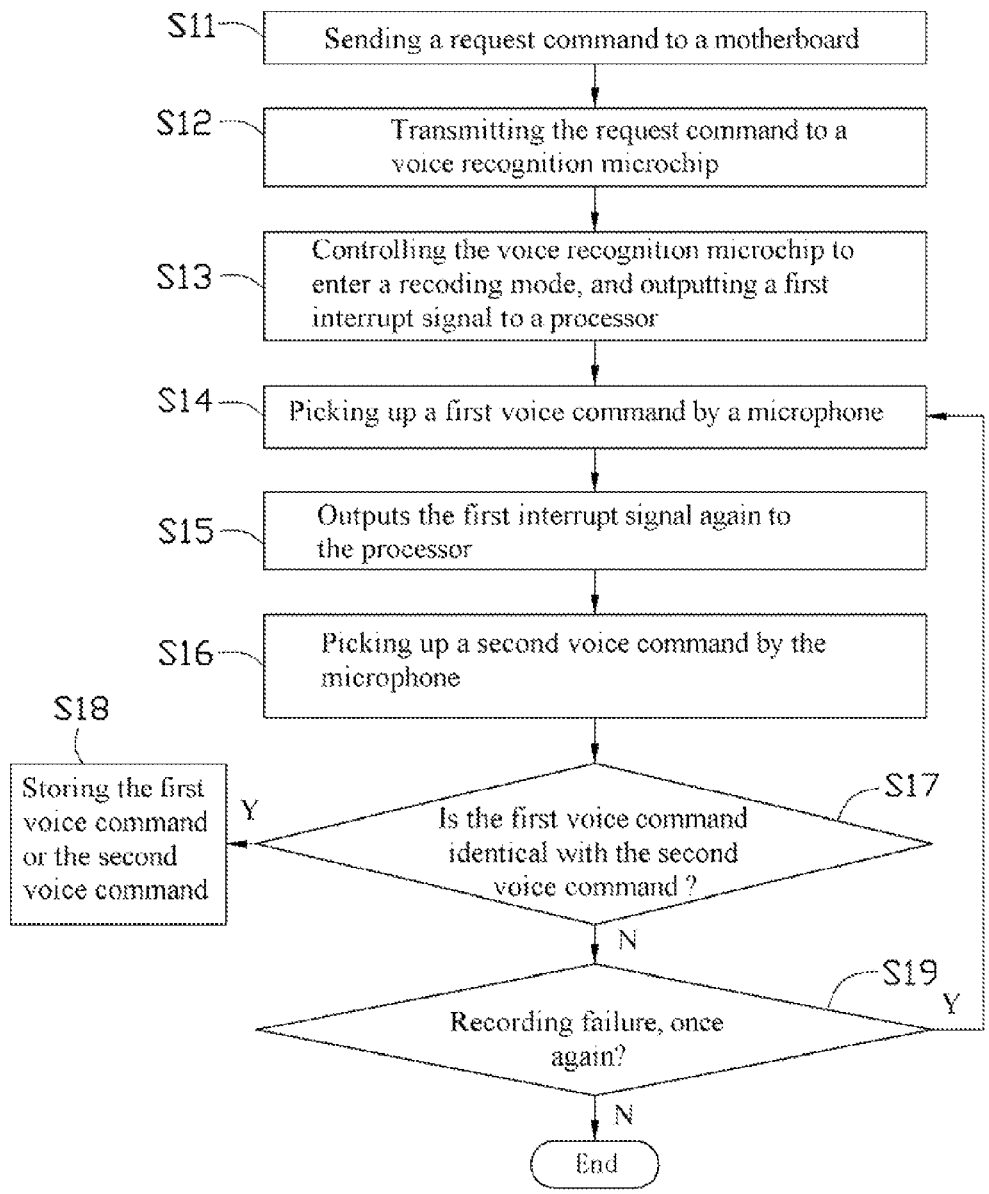
FIG. 4 is a flowchart illustrating a recording method of the method for controlling the electronic apparatus using voice as shown in FIG. 3.

FIGS. 3-4 are flowcharts of one embodiment of a method for controlling the electronic apparatus 100 to turn on using voice. Depending on the embodiment, additional blocks may be added, others removed, and the ordering of the blocks may be changed. The method for controlling the electronic apparatus to turn on using voice may at least include the following steps.

In step S1, users can pre-store voice commands in the storage system 60. The step S1 may at least further include the following sub-steps.

In sub-step S11, the recording software 10 sends the request command to the motherboard 30.

In sub-step S12, the motherboard 30 transmits the request command to the voice recognition microchip 40 through the processor 50.

In sub-step S13, the voice recognition microchip 40 enters the recording mode, and outputs the first interrupt signal to the processor 50 to further control the recording software 10, then, a first recording indication is enabled.

In sub-step S14, users begin to record, and a first voice command (e.g., "turn on") is picked up by the microphone 20.

In sub-step S15, the voice recognition microchip 40 outputs the first interrupt signal again to the processor 50, then, a second recording indication is enabled.

In sub-step S16, users record again, and a second voice command (e.g., "turn on") is picked up by the microphone 20.

In sub-step S17, the voice recognition microchip 40 compares the two voice commands from the microphone 20. If the two voice commands are identical, sub-step S18 is implemented. If the two voice commands are not identical, sub-S19 is implemented.

In sub-step S18, the voice commands are stored in the storage system 60. In addition, a notification message, such as, "OK" may be displayed on a screen (not shown) of the electronic apparatus 100.

In sub-step S19, the voice recognition microchip 40 outputs the second interrupt signal to the processor 50 to indicate recording failure. If users want to record again, sub-S14 is implemented.

In step S2, users send a new voice command (e.g., "turn on") when the electronic apparatus 100 is off but can also receive an alternating current, and then the new voice command is picked up by the microphone 20.

In step S3, the voice recognition microchip 40 determines whether the new voice command is identical with the voice commands pre-stored in the storage system 60.

If the new voice command is identical with the voice commands pre-stored in the storage system 60, S4 is implemented. If the new voice command is not identical with the voice commands pre-stored in the storage system 60, S2 is implemented.

In step S4, the voice recognition microchip 40 outputs the third interrupt signal to the processor 50, and then the processor 50 correspondingly outputs the control signal to the motherboard 30. In one exemplary embodiment, the control signal is a power button (PWRBTN) signal.

In step S5, the motherboard 30 receives the control signal and controls the electronic apparatus 100 to perform a corresponding action. In one exemplary embodiment, the motherboard 30 controls the electronic apparatus 100 to turn on when receiving the PWRBTN signal.

Additionally, users can further control the electronic apparatus 100 to perform other operations (e.g., menu selections) after the operating system of the electronic apparatus 100 has been started.

The electronic apparatus 100 can recognize voice commands from a user through the voice recognition microchip 40, and the processor 50 can output the control signal to the motherboard 30 so that the motherboard 30 can control the electronic apparatus 100 to perform a corresponding action. Thus, when the microphone 20 picks up a voice command, such as "turn on", the automatic startup of the electronic apparatus 100 can be achieved.

Although numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of exemplary disclosure to the full extent indicated by the broad general meaning of the terms in which the appended claims are expressed.

What is claimed is:

1. An electronic apparatus, comprising:
a microphone operable to pick up a voice command from a user;
a motherboard;
recording software;
a processor electronically connected to the motherboard, the processor comprising a general purpose input/output terminal; and
a voice recognition microchip electronically connected to the processor and the microphone, the voice recognition microchip comprising an interrupt pin electronically connected to the general purpose input/output terminal;
wherein the interrupt pin outputs an interrupt signal to the general purpose input/output terminal, and the processor is directed by the interrupt signal to control the recording software to generate a recording indication; and
wherein the voice recognition microchip determines whether the voice command is identical with a pre-stored voice command, the processor outputs a control signal to the motherboard according to the determination of the voice command and the pre-stored voice command, and the motherboard controls the electronic apparatus to perform an action corresponding to the control signal;
wherein the control signal is a power button (PWRBTN) signal, and the motherboard receives the PWRBTN signal and controls the electronic apparatus to turn on.

2. The electronic apparatus as claimed in claim 1, further comprising a storage system electronically connected to the voice recognition microchip, wherein the pre-stored voice command is stored in the storage system.

3. The electronic apparatus as claimed in claim 1, wherein when the voice command is identical with the pre-stored voice command, the voice recognition microchip outputs the interrupt signal to the processor.

4. The electronic apparatus as claimed in claim 3, wherein the recording software sends a request command to the voice recognition microchip through the motherboard and the processor, to control the voice recognition microchip to enter a recoding mode.

5. The electronic apparatus as claimed in claim 4, wherein the voice recognition microchip further comprises a clock pin, and a data pin, the processor comprises a clock terminal, and a data terminal, the clock terminal is electronically connected to the clock pin, the data terminal is electronically connected to the data pin.

6. The electronic apparatus as claimed in claim 5, wherein the data terminal transmits the request command to the voice recognition microchip.

7. The electronic apparatus as claimed in claim 5, wherein the voice recognition microchip further comprises a plurality of serial peripheral interface pins all electronically connected to the storage system.

8. The electronic apparatus as claimed in claim 5, wherein the processor further comprises a plurality of control terminals all electronically connected to the motherboard.

9. A method for controlling an electronic apparatus using voice, the method comprising:
generating a first recording indication according to a first interrupt signal and picking up a first voice command by a microphone;

generating a second recording indication according to a second interrupt signal and picking up a second voice command by the microphone;

comparing the first voice command and the second voice command; and storing the first voice command or the second voice command in a storage system if the second voice command is identical with the first voice command;

picking up a new voice command by the microphone;

determining whether the new voice command is identical with the stored voice command and outputting a control signal to a motherboard of the electronic apparatus according to the determination of the new voice command and the stored voice command; and controlling the electronic apparatus to perform an action corresponding to the control signal;

wherein the control signal is a power button (PWRBTN) signal, and the motherboard receives the PWRBTN signal and controls the electronic apparatus to turn on.

10. The method for controlling an electronic apparatus using voice as claimed in claim 9, further comprising sending a request command to the motherboard; and controlling a voice recognition microchip to enter a recoding mode.

11. The electronic apparatus as claimed in claim 1, wherein the microphone picks up the pre-stored voice command from the user according to the recording indication.

* * * * *